(12) United States Patent
Burchill et al.

(10) Patent No.: US 6,620,342 B1
(45) Date of Patent: Sep. 16, 2003

(54) NARROW COMPOSITION DISTRIBUTION POLYVINYLIDENE FLUORIDE RECLT FILMS, PROCESSES, ARTICLES OF MANUFACTURE AND COMPOSITIONS

(75) Inventors: Michael Timothy Burchill, Langhorne, PA (US); Marina M. Despotopoulou, Wayne, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 283 days.

(21) Appl. No.: 09/693,863

(22) Filed: Oct. 23, 2000

(51) Int. Cl.⁷ .................... G02F 1/15; G02F 1/135; G02F 1/153; B32B 27/00; C08F 12/20; C08F 14/18; C08F 214/18; H01B 1/06

(52) U.S. Cl. .......... 252/511; 252/520.1; 252/520.5; 252/521.1; 252/519.21; 252/520.3; 526/249; 526/253; 526/254; 526/255; 428/1.2; 428/1.27; 428/1.4; 428/333; 359/265; 359/270; 349/122; 556/1; 556/16; 429/306

(58) Field of Search .................. 252/520.1, 520.3, 252/520.5, 521.1, 521.2, 519.21, 518.1; 526/249, 253, 255; 428/1.2, 1.27, 1.4; 359/265, 273; 429/306; 556/1, 16

(56) References Cited

U.S. PATENT DOCUMENTS 5,111,328 A * 5/1992 Demiryont .................. 359/265

6,317,248 B1 * 11/2001 Agrawal et al. ............ 340/438

FOREIGN PATENT DOCUMENTS

JP          06075249    * 5/1994    ........... G02F/1/136

* cited by examiner

Primary Examiner—Mark Kopec
Assistant Examiner—Kallambella Vijayakumar
(74) Attorney, Agent, or Firm—The Law Offices of Robert J. Eichelburg (57) ABSTRACT

The disclosure relates to a reversible, electrically controllable light transmission (RECLT) film, article of manufacture composition, process and product produced by the process, comprising a conductive narrow composition distribution polyvinylidene fluoride copolymer in combination with an electrolyte and an RECLT material. The narrow composition distribution polyvinylidene fluoride copolymer has low solubility, high thermal stability and strength, and very high optical clarity. The polyvinylidene fluoride copolymer comprises a nonporous or porous copolymer of vinylidene fluoride preferably with either hexafluoropropylene or tetrafluoroethylene or chlorotrifluoroethylene, or vinyl acetate, or combinations thereof. The RECLT material includes organic or inorganic compounds known in the art. Typical RECLT materials include electrochromic materials, reversible metal electrodeposition materials, liquid crystal materials and dispersed particle materials.

73 Claims, 1 Drawing Sheet

NARROW COMPOSITION DISTRIBUTION POLYVINYLIDENE FLUORIDE RECLT FILMS, PROCESSES, ARTICLES OF MANUFACTURE AND COMPOSITIONS

BACKGROUND OF THE INVENTION

1. Field of the Invention

The present invention relates to reversible, electrically controllable, light transmission (RECLT) films, articles of manufacture, compositions and processes for their manufacture. Electrochromic, reversible metal electrodeposition, liquid crystal, and dispersed particle systems display comprise some RECLT phenomena.

Electrochromic materials change color upon the application of an electrical current to induce an electrochemical reaction in the material. Unlike reversible metal electrodeposition compositions and processes for light modulation, electrochromic processes do not require electrodeposition to produce a light modulating effect. Reversible metal electrodeposition for light modulation relies on the deposition and removal of a metal from a substrate to control the transmission of light. By contrast, liquid crystal systems switch between transmissive and opaque light scattering states upon the application of an electric currents, but require substantial voltages to maintain transparency.

Electrochromic devices comprise an electrochromic film operatively associated with a substantially transparent electrode and a counter electrode. The electrochromic film generally is sandwiched between the transparent electrode and the counter electrode and will change color on the application of an electric current. Reversing the polarity of the current will cause the film to lose color.

In operation, reversible metal electrode position for light modulation involves applying a negative electric potential to a first electrode, relative to a second electrode. The applied potential tends to cause deposited metal to dissolve from a second electrode in an electrolytic solution in between the two electrodes followed by electrodeposition from the solution onto the first electrode. This impedes the propagation of radiation through the device. Upon reversing polarity, and applying a positive electrical potential to the first electrode relative to the second electrode, deposited metal dissolves from the first electrode and onto the second electrode to increase the light transmissivity of the device.

The active layer of a dispersed particle system has needle shaped particles suspended in an organic fluid or gel. The dispersed particle device comprises the organic fluid or gel placed between two electrical conductors. Applying an electrical field causes the particles to align causing transmission to increase. Turning the field off, causes the particles to align randomly and become light absorbing.

As noted, liquid crystal-based systems switch between transmissive and opaque scattering states upon the application of an electric current and reversal of the polarity of the electric current. The liquid crystal device comprises a liquid crystal material well known in the art, combined with a matrix material sandwiched between transparent positive and negative electrodes.

2. Related Art

Many related art electrochromic elements employ tungsten oxide since it changes from a clear, transparent state to a colored state upon the application of an electric current. Transition metal compounds such as transition metal oxides also display electrochromic properties when changing from one valence state to another such as transition metals varying between the +2 and +3 valence state or transition metals varying between the +3 and +4 valence states. The related art also describes many organic compounds that display electrochromic properties.

Color changes, rates and performance characteristics, whether inorganic or organic electrochromic materials, depend on the electrochromic material used as well as the entire electrochromic system including the electrolyte and cell configuration. P. N. Moskalev I. S. Kirin, *Opt. Spectrosc.*, 29, 220 (1970), and P. N. Moskalev and I. S. Kirin, *Russ. J. Phys. Chem.*, 47, 1019 (1972) describe electrochromic reactions of rare earth diphthalocyanines. Similarly, M. M. Nicholson and F. A. Pizzarello, *J. Electrochem Soc.*, 127, 2490 (1979) describe color changes in a lutetium diphthalocyanine film on tin oxide in an aqueous electrolyte of potassium chloride or sodium sulfate. M. M. Nicholson and F. A. Pizzarello, *J. Electrochem Soc.*, 128, 1740 (1981) amplify their earlier work. D. Lawton, B. Ely and G. Elliott, *J. Electrochem. Soc.*, 128, 2479 (1981) describe electrochromic action of other rare earth diphthalocyanines and find changes similar to lutetium and ytterbium diphthalocyanines in a variety of aqueous and organic electrolyte liquids.

Viologens, i.e., 4,4'-dipyridinium compounds, also display electrochromic properties in aqueous and organic liquid electrolyte systems. R. J. Jasinski, *J. Electrochem. Soc.*, 124, 637 (1977) describes the electrochromic properties of n-heptylviologen in salt solutions and their dependence upon specific anions, cations and metals present. H. T. van Dam and J. J. Poujee, *J. Electrochem. Soc.*, 121, 1555 (1974) developed data on the differences in redox potentials between ethylviologen and benzylviologen in aqueous and/or liquid solvents. J. Bruinink and C. G. A. Kregting, *J. Electrochem. Soc.*, 125, 1397 (1978) discuss the electrochromic changes of diheptylviologen films on tin oxide electrodes in an aqueous electrolyte. B. Reichman, F. F. Fan and A. J. Bard, *J. Electrochem. Soc.*, 127, 333 (1980) investigated the photoreduction of aqueous solutions of heptylviologen bromide on p-gallium arsenide in photoelectrochemical cells. H. T. van Dam, *J. Electrochem. Soc.*, 123, 1181 (1976) sets out the differing conductants of heptylviologen in aqueous and organic solvents. C. J. Schoot et al., *Applied Physics*, Vol. 23, No. 2 (Jul. 15, 1973) pp. 64–65 describes other organic electrochromic materials in combination with liquid electrolytes. L. G. van Uitert et al., *Applied Physics Letters*, Vol. 36, No.1 (Jan. 1, 1980) pp. 109-11 discloses anthraquinone red electrochromic display cells.

Sammells, U.S. Pat. Nos. 4,750,817 and 4,807,977 describe multicolor electrochromic flat-panel displays based on solid-state electrochromic cells with solid polymer electrolytes. The references disclosed the use of polyvinylidene fluoride as an alkali ion conducting polymer in combination with various electrochromic compounds and an electrolyte.

Hirai, U.S. Pat. No. 4,550,982 illustrates an electrochromic display device based on a polymer layer containing at least one organic electrochromic material and at least one anionic material to provide a polymer redox layer. Examples of polymer materials include fluororesins such as polyvinylidene fluoride.

Eid et al., U.S. Pat. No. 5,332,530 describe a device for the modulation of light consisting of two glass substrates, each coated with a transparent electrically conducting layer such as tin oxide or a mixture of indium oxide and tin oxide (ITO). The substrates have a thin layer of an electrolyte containing metal ions sandwiched in between them. The application of an electric current to the electrodes results in the deposition of the metal on one of the substrates by means of an electrochemical reduction. Reversing the current causes the metal to redeposit as an ionic species in the electrolyte.

The related art devices according to Eid et al. relied on an aqueous electrolyte containing a strong mineral acid to prevent hydrolysis of metal salts in the electrolyte. The electrolyte had a low pH and consequently the drawback of generating hydrogen gas concurrently with electrodeposition of the metal layer. Additionally in some instances this caused the degradation of the transparent electrically conductive material. Eid et al. addressed the problem by employing a polymeric electrolyte dissolved in an organic solvent to produce a gel-like matrix. Eid et al. disclose a commercial grade of polyvinylidene fluoride as one of the polymeric electrolytes.

Tench et al., U.S. Pat. No. 5,903,382 also employed a polymeric material in an electrolytic composition used for reversible metal electrodeposition in a light modulating device. Tench et al. describe this as a "solid state" gel electrolyte and the polymer as electrochemically inert, selected to minimize sensitivity to atmospheric contamination. Typical polymers comprise acrylic materials such as polymethyl methacrylate or polyacrylonitrile.

Although various references disclose the use of polyvinylidene fluoride resins in the manufacture of RECLT devices, commercial grades of these resins do not have the low solubility, high thermal stability and strength, or optical clarity required for the production of a high quality RECLT device, especially an electrochromic device.

Accordingly, an RECLT film, article of manufacture or composition avoiding the difficulties encountered with polyvinylidene fluoride having high solubility, low thermal stability and strength, and low optical clarity would provide an advantage over polyvinylidene fluoride materials presently used, which slow down the speed of the cell and do not provide sharp differences between the activated and inactivated configurations of the cell.

The present invention avoids these and other difficulties encountered in the prior art by providing an RECLT film, process of manufacture, article of manufacture and composition based on a polyvinylidene fluoride copolymer having exceptionally low solubility and high thermal stability and strength, and high optical clarity that substantially obviates one or more of the foregoing and other problems due to the limitations and disadvantages of the related art.

The written description that follows sets out additional features and advantages of the invention and makes them apparent, and which the skilled artisan can also learn by practice of the invention. The RECLT film, process of manufacture, article of manufacture and composition of the invention as particularly pointed out in the written description and claims hereof as well as the appended drawings illustrate how to obtain the objectives and other advantages of the invention.

SUMMARY OF THE INVENTION

To achieve these and other advantages and in accordance with the purpose of the invention, as embodied and broadly described, the invention comprises an RECLT, film, process of manufacture, article of manufacture, and composition based on a narrow composition distribution (NCD) polyvinylidene fluoride copolymer, an electrolyte and known organic or inorganic RECLT materials.

BRIEF DESCRIPTION OF THE DRAWING

The accompanying drawing, which is incorporated in and constitutes a part of this specification, illustrates embodiments of the invention, and together with the written description serves to explain the objects, advantages, and principles of the invention. In the drawing.

DETAILED DESCRIPTION

The present invention comprises an RECLT film, article of manufacture, composition, and process for their manufacture based on an RECLT material and an electrically conductive NCD polyvinylidene fluoride copolymer combined with an electrolyte. For the purpose of the present invention RECLT phenomena includes electrochromic, reversible metal electrodeposition, liquid crystal, and dispersed particle phenomena. The combination of the NCD copolymer with an electrolyte or ion transfer composition or compound provides or enhances electric conductivity.

RECLT devices employ an RECLT material in a matrix, such as a polymer mixed with the RECLT material cast as a thin film for placement between a substantially transparent electrode and counter electrode. Other devices employ a polymer combined with an electrolyte sandwiched in between two transparent electrodes, at least one of which has an RECLT material on it.

The matrix or polymer must meet strict requirements including:

electrochemical stability for thousands of charge/discharge cycles;

stability to acid ($H^+$) to assure electrical neutrality;

stability to ultraviolet light;

stability to thermal degradation;

electrical conductivity (rigid or plasticized); and high optical clarity (substantially no haze).

The evaluation of several vinylidene fluoride, tetrafluoroethylene, or hexafluoropropylene, copolymers, has shown these types of polymers posses the foregoing properties, but more important, NCD copolymers not only have these properties, but also improved low solubility and high strength as well as clarity, the most important characteristics of the polymer for this application. In fact, evidence shows that at equivalent hexafluoropropylene levels of a polyvinylidene fluoride-hexafluoropropylene copolymer, the NCD polymers have significantly lower solubility, higher strength, and greater clarity than broad composition distribution (BCD) polymers.

In one embodiment the RECLT film or article of manufacture utilizing such film comprises a porous or non-porous NCD polyvinylidene fluoride copolymer film especially a copolymer with hexafluoropropylene or tetrafluoroethylene or mixtures of hexafluoropropylene or tetrafluoroethylene. The comonomer, and especially hexafluoropropylene or tetrafluoroethylene or mixtures thereof may be present in the polymer in an amount from about 1 to about 66 wt. % especially from about 1 to 20% and preferably from about 1 to about 15% by wt. The ratio of two comonomers, and especially hexafluoropropylene to tetrafluoroethylene, vary anywhere from about 50:1 to about 1:50 and especially from about 20:1 to about 1:20 on a molar basis.

Other comonomers polymerizable with vinylidene fluoride to form the NCD copolymers employed according to the present invention comprise chlorotrifluoroethylene (CTFE), or vinyl acetate in addition to hexafluoropropyoene or tetrafluoroethylene either as the sole comonomer or any combinations of the comonomers, especially the two component or three component combinations.

Provisional U.S. Patent Application Serial No. 60/038,346 filed Feb. 28, 1997 entitled Copolymers of Vinylidene Fluoride and Hexafluoropropylene Having Reduced Extractible Content and Improved Solution Clarity, published as Indonesian Application W-980105 as Publication No. 020.295A on Nov. 26, 1998 and Indonesian Application W-980106, Publication No. 020.294A published Nov. 26, 1999 and Thailand Application 043657 and 043656 both published Dec. 15, 1998, all of which applicants incorporate herein by reference in their entirety, disclose a method for the manufacture of NCD polymers, and describe one species of these polymers in detail. U.S. patent applications Ser. No. 09/031,015 filed Feb. 26, 1998, Ser. No. 09/136,570 filed Aug. 19, 1998 and Continuation in Part application Ser. No. 09/641,015 filed Aug. 17, 2000 also describe the NCD polymers of the present invention and are incorporated herein by reference in their entirety. Substituting other comonomers or mixtures thereof, known in the art and described herein, for the hexafluoropropylene using the polymerization technique described in these applications also results in the production of NCD polymers suitable for use according to the present invention.

Dittman et al. U.S. Pat. No. 2,752,331, incorporated herein by reference, describes the polymerization of vinylidene fluoride with chlorotrifluoroethylene with a distribution of vinylidene fluoride and chlorotrifluoroethylene in the polymer analagous to the vinylidene fluoride-hexafluoropropylene NCD copolymers used according to the present invention.

In the copolymerization of vinylidene fluoride with a comonomer such as hexafluoropropylene, prior art polymerization processes for the copolymers show two types of histograms or bell-curves that characterize the copolymers. In the first instance, the molecular weight distribution follows a somewhat broad histogram or bell-curve having a notable percentage of low molecular weight and high molecular weight fractions as compared to the average, which is the peak of the bell-curve. Similarly, because the polymerization rates of the copolymers, e.g., vinylidene fluoride and hexafluoropropylene, differ significantly, the quantity of hexafluoropropylene in the copolymer as a low fraction and high fraction of the total copolymer follows a typical histogram or bell-curve, with the peak of the bell-curve giving the average hexafluoropropylene content.

Applicants refer to these copolymers produced according to the prior art methods as broad composition distribution or BCD polymers. By contrast, the NCD polymers, although having the same average molecular weight as BCD polymers, have relatively less of the low molecular weight and high molecular weight fractions than a conventional polymer. Similarly, the NCD polymers used according to the present invention have relatively less of the small percentages and large percentages of comonomer or comonomers such as hexafluoropropylene in the copolymer even though the NCD and BCD copolymers have the same average comonomer content.

On average, when comparing the NCD polymers to the BCD polymers, the former, at the same average molecular weight and the same average comonomer content, e.g., hexafluoropropylene, have a higher melting point, lower solubility, and greater thermal stability than BCD polymers. The NCD polymers of the invention also have outstanding U.V. stability and will substantially retain their strength at elevated temperatures in the presence of a solvent as compared to BCD polymers. This gives them an advantage in RECLT windows, mirrors and devices used in the control of direct sunlight or other electromagnetic radiation that has a heating effect or tends to decompose organic materials. The advantages of the NCD copolymers of the present invention of lower solubility and increased thermal stability tend to eliminate or minimize electrolyte leakage from the film employed in the RECLT device and provide a material that won't soften as much as BCD materials in direct sunlight or other heating type of electromagnetic radiation. Additionally, the clarity of the NCD materials employed according to the present invention make them especially suitable for those applications requiring transparency such as window panes, mirrors display devices and the like.

The process used to make the instant copolymers requires one ratio of VDF and HFP for the initial fill of the reactor, and a different ratio of VDF and HFP during a subsequent continuous feed of the monomers. Any particular desired average HFP content in the copolymer product has corresponding particular initial fill and subsequent feed ratios. The uniformity of compositions prepared this way provide unique and useful properties in comparison to all VDF/HFP copolymers previously known. These differences are not due to the presence or absence of foreign material impurities.

The invention provides in a first NCD composition aspect a copolymer of vinylidene fluoride and hexafluoropropylene containing a maximum of about 24 weight percent hexafluoropropylene, having a uniform distribution of hexafluoropropylene residues between chains, such uniformity being demonstrated by the copolymers having solutions of improved clarity and fluidity, such uniformity additionally being demonstrated by:

i) for the copolymers having up to about 8 weight percent nominal HFP content, having weight percent extractables within plus or minus 1.5% of the percent by weight extractables calculated by an equation selected from the group consisting of:

a)

Wt. % Extractable=1.7 (HFP mole %)−3.2, and b)

Wt. % Extractable=−1.2+1.5 (HFP mole %)−8×10$^{-6}$ (Mn)

when

HFP content is determined by Method A described below, and ii) for the copolymers having 8 weight percent nominal HFP content and greater, having a DSC (differential scanning calorimetry) melting point at least 2.5° C. lower than the DSC melting point of copolymers having the same nominal weight percent HFP prepared by processes reported in the prior art when the HFP content is determined by Method A described below and having DSC melting points which fall on or below a value determined by the equation:

DSC melting point in deg. C=166.7−2.9 (HFP wt %), when the HFP content is determined by Method B described below.

The tangible embodiments of this first NCD composition aspect of the invention are straw colored to colorless semi crystalline solids having melting points, as determined by differential scanning calorimetry (DSC), lower than VDF/HFP copolymers having the same nominal HFP percentage content prepared by processes reported in detail in the prior art.

The tangible embodiments of this first NCD composition aspect of the invention also possess longer gelation times from solution as well as greater clarity and fluidity of solutions containing them than VDF/HFP copolymers having the same nominal HFP content prepared by processes reported in detail in the prior art.

The processes reported in detail in the prior art are stated to provide sufficient information for accurate reproduction of their experimental methods. Specifically, they are U.S. Pat. Nos. 3,178,399 and U.S. Pat. 5,093,427 all of which are concerned with VDF, HDF copolymers. The DSC of the copolymers produced by the methods of these references containing HFP content of 8 weight percent or greater up to about 24 weight percent fall above the value determined by the DSC melting point equation stated above.

The aforementioned physical characteristics taken together with the method of synthesis positively tend to confirm the structure and the novelty of the compositions sought to be patented.

The tangible embodiments of the first NCD composition aspect of the invention have the inherent applied use characteristics of being suitable for paint and powder coating vehicles and as chemically resistant shaped objects and films both supported and unsupported. Particular mention is made of copolymers of the first NCD composition aspect of the present invention having from about 2 weight % HFP content to 8 weight % HFP, more particularly copolymers having about 3 to 7 weight HFP, still more particularly those having 3 to 6 wt % HFP which possess the inherent applied use characteristics of being particularly suitable as polymeric separators and polymeric electrode matrices for RECLT devices, particularly lithium batteries.

Particular mention is also made of copolymers of the first NCD composition aspect of the invention having from about 7 weight percent HFP content to about 15 weight percent HFP content, more particularly copolymers having about 10 weight percent HFP content which possess the inherent applied use characteristic of being suitable as flame resistant insulation for wire and cable.

Still further mention is made of copolymers of the first NCD composition aspect of the invention having greater than about 15 weight percent HFP content, still more particularly of copolymers having about 16% by weight or greater HFP content which have the inherent applied use characteristic as clear, flexible, chemically resistant films.

Special mention is made of embodiments of the second NCD composition of the invention wherein the VDF/HFP copolymer has a hexafluoropropylene content of from about 2 wt % up to 8 wt % hexafluoropropylene, particularly those having from 3 weight % to 7 weight % hexafluoropropylene, still more particularly, those having about 3 weight % to 6 wt % hexafluoropropylene.

As used herein and in the appended claims, vinylidene fluoride polymers (or VDF polymers) of the present invention means the VDF/HFP copolymers which are the first NCD composition aspect of the invention.

The invention provides in a third composition aspect, a solution of a composition of the first composition aspect of the invention having improved solution clarity and fluidity.

Copolymers of vinylidene fluoride and hexafluoropropylene of up to about 24 wt % hexafluoropropylene are useful semicrystalline thermoplastics. As the HFP content increases in the materials, the crystallinity decreases, and, correspondingly, the flexibility and solvent sensitivity increase. Other properties change as well, such as the final melting point, which decreases with increasing HFP content. In high-purity applications such as membrane filtration or extraction, lithium battery construction, high transparency film from solution casting, and fluid storage and transport requiring low contaminant levels, it is desirable to have materials with low levels of extractables, little gel formation in the presence of solvent, and good clarity. The NCD-VDF/HFP copolymers provided here show lower extractables, improved solution properties, improved clarity and fluidity, and lower melting points in comparison to the BCD nonuniform VDF/HFP copolymers of otherwise similar HFP content whose manufacture is enabled in the prior art.

The NCD copolymers of the present invention are uniform, by which it is meant that there is decreased chain to chain variation in the distribution of HFP residues in polymer chains in comparison to the nonuniform copolymers of the prior art where the HFP content from chain to chain varies broadly, thereby imparting measurably different inherent physical and chemical properties.

Thus, the invention provides copolymers of vinylidene fluoride and hexafluoropropylene having hexafluoropropylene content of up to about 24 wt % which have a uniform HFP residue content between polymer chains in the bulk polymer and, thus, have improved solution clarity and fluidity and reduced extractables, The copolymers are conveniently made by an emulsion polymerization process, but suspension and solution processes may also be used. In an emulsion polymerization process a reactor is charged with deionized water, water-soluble surfactant capable of emulsifying the reaction mass during polymerization, paraffin antifoulant, vinylidene fluoride, hexafluoropropylene, chain-transfer agent to control copolymer molecular weight, and initiator to start and maintain the polymerization. To obtain the VDF/HFP copolymers of the present invention, the initial charge of VDF and HFP monomers is such that the amount of HFP is up to 48% of the combined weight of the monomers initially charged, and then VDF and HFP are fed continuously throughout the reaction such that the amount of the HFP is up to 24% of the combined weight of the monomers fed continuously. The VDF/HFP ratios are different in the initial charge and during the continuous feed, and each final polymer composition has definite and related ratios for the initial charge and continuous feed. The process uses total amounts of VDF and HFP monomers such that the amount of HFP used is up to about 24% of the combined total weight of the monomers.

The reactor is a pressurized polymerization reactor equipped with a stirrer and heat control means. The temperature of the polymerization can vary depending on the characteristics of the initiator used, but it is typically between 65° and 105° C., and most conveniently it is between 75° and 95° C. The temperature is not limited to this range, however, and might be higher or lower if a high-temperature or low-temperature initiator is used. The VDF/HFP ratios used in the polymerization will be dependent on the temperature chosen for reaction. The pressure of the polymerization is typically between 2750 and 6900 k2a, but it can be higher if the equipment permits operation at higher pressure. The pressure is most conveniently between 3790 and 5860 kPa.

Surfactants used in the polymerization are water soluble, halogenated surfactants, especially fluorinated surfactants such as the ammonium, substituted ammonium, quaternary ammonium, or alkali metal salts of perfluorinated or partially fluorinated alkyl carboxylates, the perfluorinated or partially fluorinated monoalkyl phosphate esters, the perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in U.S. Pat. No. 2,559,752 of the formula $X(CF^2)_n COOM$, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula $X(CF^2)_n CH_2 OSO_3 M$, where X and M are as above; and salts of the acids of the formula $CF_3(CF_2)n(CX_2)mSO_3M$, where X and M are as above, n is an integer from 3 to 7, and m is an integer from 0 to 2, such as in potassium perfluorooctyl sulfonate. The use of a microemulsion of perfluorinated polyether carboxylate in combination with neutral perfluoropolyether in vinylidene fluoride polymerization can be found in EP0816397AI. The surfactant charge is from, 0.05% to 2% by weight on the total monomer weight used, and most preferably the surfactant charge is from 0.1% to 0.2% by weight.

The paraffin antifoulant is conventional, and any long-chain, saturated, hydrocarbon wax or oil may be used. Reactor loadings of the paraffin are from 0.01% to 0.3% by weight on the total monomer weight used.

After the reactor has been charged with deionized water, surfactant, and paraffin antifoulant, the reactor is either purged with nitrogen or evacuated to remove oxygen. The reactor is brought to temperature, and chain-transfer agent may optionally be added. The reactor is then pressurized with a mixture of vinylidene fluoride and hexafluoropropylene.

Chain-transfer agents which may be used are well known in the polymerization of fluorinated monomers. Alcohols, carbonates, ketones, esters, and ethers are oxygenated compounds which serve as chain-transfer agents. Specific, but not limiting examples, are isopropyl alcohol, such as described in U.S. Pat. No. 4,360,652, acetone, such as described in U.S. Pat. No. 3,857,827, and ethyl acetate, as described in the Published Unexamined Application (Kokai) JP 58065711. Other classes of compounds which serve as chain transfer agents in the polymerization of fluorinated monomers are halocarbons and hydrohalocarbons such as chlorocarbons, hydrochlorocarbons, chlorofluorocarbons, and hydrochlorofluoro-carbons; specific, but not limiting examples are trichlorofluoromethane, such as described in U.S. Pat. No. 4,569,978, and 1,1-dichloro-2,2,2-trifluoroethane. Chain-transfer agents may be added all at once at the beginning of the reaction, in portions throughout the reaction, or continuously as the reaction progresses. The amount of chain-transfer agent and mode of addition which is used depends on the activity of the agent and the desired molecular weight characteristics of the product. The amount of chain-transfer agent used is from 0.05% to 5% by weight on the total monomer weight used, and preferably it is from 0.1 to 2% by weight.

The reactor is pressurized by adding vinylidene fluoride and hexafluoropropylene monomers in a definite ratio (first effective ratio) such that the hexafluoropropylene ranges up to 48% of the combined weight of the monomers initially charged. The first effective ratio used will depend on the relative reactivity of the two monomers at the polymerization temperature chosen. The reactivity of vinylidene fluoride and hexafluoropropylene has been reported in Bonardelli et al., Polymer, vol. 27, 905–909 (Jun. 1986). The relative reactivity is such that to obtain a particular uniform copolymer composition, more hexafluoropropylene has to be charged to the reactor in the initial fill than will be incorporated into the copolymer. At the convenient polymerization temperature range of this invention, about twice as much hexafluoropropylene has to be charged to the reactor in the initial fill as will appear in the polymer.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (II) salts being a particular example, optionally combined with activators such as sodium formaldehyde sulfoxylate or ascorbic acid. Among the organic peroxides which can be used for the polymerization are the classes of dialkyl peroxides, peroxyesters, and peroxydicarbonates. Exemplary of dialkyl peroxides is di-butyl peroxide, of peroxyesters are t-butyl peroxypivalate and t-amyl peroxypivalate, and of peroxydicarbonates are di(n-propyl) peroxydicarbonate, diisopropyl peroxydicarbonate, di(sec-butyl) peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396, and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP5806571 1. The quantity of an initiator required for a polymerization is related to its activity and the temperature used for the polymerization. The total amount of initiator used is generally between 0.05% to 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

As the reaction progresses, a mixture of vinylidene fluoride and hexafluoropropylene monomers is fed in a definite ratio ( second effective ratio) so as to maintain reaction pressure. The second effective ratio used corresponds to the monomer unit ratio desired in the final composition of the copolymer, and it can range up to 24% of the combined weight of the monomers being fed continuously throughout the reaction. The feed of vinylidene fluoride, hexafluoropropylene, and optionally initiator and chain-transfer agent is continued until the desired reactor fill is obtained.

Upon reaching the desired reactor fill, the monomer feeds are terminated. To achieve the copolymer having optimum solution clarity and minimal extractables, all other feeds are stopped at the same time as the monomer feeds, and the reactor is vented as soon as is practicable. Alternatively, to achieve highest yield at the expense of solution clarity and extractables, a react-out period to consume residual monomer is used with optional continuation of initiator feed. For react-out, the reaction temperature and agitation are maintained for a period of 20 to 30 minutes, but a longer period can be used if required in order to consume monomer to the point where the reactor pressure is no longer falling to any significant degree. A settling period of typically 10 to minutes may be used following the react-out period. During the settling period, temperature is maintained but no initiator feed is used. The reactor is then cooled and vented.

The product is recovered as a latex. To obtain dry resin, the latex is coagulated, the coagulum is separated and the separated coagulum may be washed. To provide powder, the coagulum is dried.

For the coagulation step, several well-known methods can be used including freezing, the addition of acids or salts, or mechanical shear with optional heating. The powder, if desired, can be further processed into pellets or other convenient resin forms.

The vinylidene fluoride polymer of the present invention is not required to have an open or closed porous structure for operability. It provides enhanced electrolyte mobility in combination with the intrinsic ionic conductivity effects of the polymer regardless of its initial porous or non porous state. Vinylidene fluoride electrode or separator-absorber combined with electrode or electrolyte materials at the surface of the pores of the porous polymer was previously believed to make the utilization of the active material, whether electrode material or electrolyte material more efficient and provide a method for the easy manufacture of the efficient electrodes and separator-absorber structures. There are, however, other advantages to use of porous polymer structures even for the polyvinylidene fluoride polymers of the present invention.

It is also believed that the segregation of the active materials on the surface of active pores will allow for varying the amount of binder in the electrode of the separator-absorber to enhance strength with minimum effect on RECLT device performance. The RECLT device formed in this way therefore will have improved mechanical properties and can be made to be self-supporting i.e., secondary reinforcing structures do not have to be employed such as a metal or other conventional battery casing material.

This also leads to ease of fabrication where the RECLT device is enveloped or enclosed in a vinylidene fluoride homopolymer which will adhere to the porous electrodes and/or the absorber-separator structures. Adhesion can be obtained by simple heat bonding or radio frequency (rf) welding or other similar processes well known in the art. Adhesives are not required, but importantly, the exterior part of the electrochemical cell (i.e., the envelope) is of the same type or a substantially similar type of material as the electrodes and absorber-separator and is more compatible therewith and adherent thereto, thereby simplifying and reducing the cost of manufacture in that only one type of material is used for the structural components of the cell as compared to either conventional dry cell or secondary cell construction.

Polyvinylidene fluoride in general absorbs rf frequency and may also be heated by dielectric techniques. Heat guns may also be used for sealing polyvinylidene fluoride surfaces under pressure. Welding rods may also be employed to heat seal two pieces easily as is done in the fabrication of larger polyvinylidene fluoride structures. The joints obtained are usually as strong as the basic resins employed. Because polyvinylidene fluoride polymers are abrasion resistant and tough as well as chemical resistant, they are useful in the internal and external element of the battery and, as noted previously, can be assembled by non-adhesive means by heat bonding.

By selecting vinylidene fluoride polymers of the present invention for electrodes and such polymers or conventional or VDF polymer for cladding that are either extremely flexible or somewhat rigid, structures can be fabricated that are in turn either flexible or somewhat rigid. Further in this regard, enhanced rigidity can be obtained by cross-linking the vinylidene fluoride homo- or copolymers in general either chemically, but preferably by employing high energy radiation such as high energy (about 10 to about 20 Mrad) electron beam radiation, with some attendant dehydrofluorination. One potential benefit is the further stabilization of the amorphous regions in the vinylidene fluoride polymers, i.e., inhibitions of crystallization over time which is important since ionic conductivity of the electrolyte is believed to occur primarily in the amorphous or open regions.

As noted previously, vinylidene fluoride polymers in general affect ionic conductivity in a manner that makes them suitable for the fabrication of RECLT devices.

Since mobility of charged species is required in RECLTdevices, it is believed that the migration of charged species in polyvinylidene fluoride polymers will be through the amorphous phase. The vinylidene fluoride polymers of the present invention have been recognized by the invention as having enhanced amorphous phases which are more stable and particularly for the HFP and CTFE copolymers provide this benefit to conductivity and the like at lower comonomer levels, thus, providing solubility and temperature advantages approaching that of homopolymers.

In the triboelectric series, most polymers stabilize electrons. Vinylidene fluoride polymers, however, are unique in stabilizing positive holes and are one of the most effective media in this regard, presumably due to the highly negative gemdifluorocarbon group.

Since conductivity is inversely related to crystallinity of the polyvinylidene fluoride polymer, it has been determined that conventional copolymers of vinylidene fluoride with about 7 to about 25% hexafluoropropylene sufficiently reduce the crystalline structure of the polymer without sacrificing mechanical properties so that acceptable ionic conductivity effects of the polymer can be obtained. The NCD vinylidene fluoride polymers of the present invention provide benefits equal to or better than the above conventional or BCD-VDF/HFP copolymers at comonomer levels below 8% by weigh, preferably below 7% by weight more preferably below 6% by weight.

The various porous or non-porous structures, depending on the their tensile strength, can be mechanically oriented by stretching or the application of tensile forces in order to enhance the amount of beta conformation within the polymer structure and thereby possibly promote ionic conductivity depending upon the electrolyte and polyvinylidene fluoride composition.

Using solvent and non-solvent combinations, polyvinylidene fluoride polymers of the present invention are cast in thin membranes. This method is described by Benzinger et al. in U.S. Pat. No. 4,384,047 which is incorporated herein by reference. The electrode materials or the electrolyte materials as described herein can be incorporated into polyvinylidene fluoride solution prior to casting it into a film or sheet, after which the solution may, if desired, be converted to a porous polyvinylidene fluoride membrane combined with the electrode of electrolyte materials. These films or sheets, either with or without the electrode or electrolyte materials can be any where from about 0.25 to about 100, particularly from about 0.5 to about 10, and especially from about 1 to about 8 mils thick, and are especially suitable for further treatment by stretching or the application of tensile forces in order to promote the beta conformation necessary to achieve ferroelectric properties in polyvinylidene fluoride.

There are three classes of organic liquids, that may be used to make solutions dispersions of vinylidene fluoride polymers. Active solvents are those organic liquids that dissolve or swell vinylidene fluoride polymers at room temperature and typically consist of lower alkyl ketones, esters and amides. Latent solvents are those organic liquids that do not dissolve vinylidene fluoride homo- or copolymers at room temperature; however, will dissolve polyvinylidene fluoride at elevated temperature and typically are medium chain length alkyl ketones, esters, glycol ethers and organic carbonates. Nonsolvents are organic liquids that do not dissolve or swell vinylidene fluoride polymers up to the boiling point of the liquid or the crystalline melting point of the vinylidene fluoride polymer, whichever condition is met first. These liquids typically are aromatic hydrocarbons, aliphatic hydrocarbons and chlorinated hydrocarbons or other chlorinated organic liquids. The solvents and latent solvents are used in the manufacture of the polyvinylidene fluoride films or sheets of the present invention.

Melt viscosity measurements of the NCD copolymers are by ASTM D3835 at 232° C. and 100 s$^{-1}$.

Thermal properties are measured with a Differential Scanning Calorimeter (DSC) according to ASTM D3418.

HFP content was determined by two alternative Methods:

Method A:

HFP content was determined by 19F NMR according to the signal assignments and method described in Pianca et al., Polymer, vol. 28, 224–230 (February 1987). A Unity 400 spectrometer at 376.3 MHz was used. Spectra were obtained either in deuterated dimethyl formamide at 50° C. with an excitation pulse width of 8.0 microseconds and a recycle delay of 10 seconds, in deuterated dimethyl sulfoxide at 80° C. with an excitation pulse width of 6.0 microseconds and recycle delay of 5 seconds, or in deuterated acetone at 50' C. with an excitation pulse width of 8.0 microseconds and a recycle delay of 20 seconds.

Method B

HFP content was alternatively determined by $^{19}$F NMR using the following methods.

In preparation for the NMR analysis, VDF/HFP copolymer samples were dissolved in a 5 mm diameter NMR tube. Samples of less than 10 weight percent HFP were dissolved in DSMO-d6 at 80° C., while samples of more than 10 weight percent HFP were dissolved in acetone-d6 at 50° C. An amount of copolymer, 2 to 4 mg, was placed in a tube, and enough solvent was added to fill the tube to 5.5 cm (about 0.75 mL of solvent). A heating block was used to bring the samples to temperature. The samples were heated for at least one hour, until the solid was dissolved, and there was no gel present, but in the case of DMSO-d6, for a time no longer than 8 hours in order to avoid degradation. Tubes were inverted to check for gel.

Spectra were acquired on either a Bruker DMX or a Varian Mercury 300 spectrometer operated at 80° C. in the case of DMSO-d6 solvent or at 50° C. in the case of acetone-d6 solvent. Specific parameters for the instruments were as follows:

| | Brucker DMX | Varian Mercury 300 |
|---|---|---|
| "F signal frequency | 281.9 MHz | 282.3 MHz |
| pulse width | 45° at 2.5 us | −30° at 2.5 us |
| recycle delay | 5s | 5s |
| linear prediction | not needed* | first 12 point are back predicted using 1024 points and 64 coefficients** |

-continued

| | Brucker DMX | Varian Mercury 300 |
|---|---|---|
| probe | 5 mm high temp H/F | 5 mm Nalorac zspec |
| $^1$H decoupling*** | yes | no |
| sweep width | 125 kHz | 100 kHz |
| acquisition time | 1.05 s | 0.3 s |

*No fluorine background observed on this instrument.
**This will be instrument dependent, depending on severity of background.
***This is inverse gated decoupling on the Bruker to improve resolution.

Spectra were analyzed according to the signal assignments described in Pianca et al., Polymer, vol. 28, 224–230 (February 1987). As a check on the accuracy of the NMR acquisitions, the integrals CF3's and the CF's were compared to see if they were in the ratio of 3 to 1.

Molecular weights were measured by size exclusion chromatography (SEC). A Waters 150 C chromatographic device with a set of PL gel 2 mixed B columns with bead size of 10 microns was used at an operating temperature of 105 degrees C. HPLC grade dimethyl sulfoxide (DMSO) was used as the eluant at flow rate of 1.0 mL/min. The samples were prepared by dissolution in DMSO for 5 hours at 100 degrees C., followed by filtration.

The NCD copolymers of the present invention may have greater than 8% by weight HFP content or from about 2 up to 8 weight % HFP or from about 3 to about 6 weight % HFP content.

The NCD copolymers of the present invention also comprise blends of these polymers with other polymers known in the art such as acrylates as well as other polymers containing ester groups, for example, alkyd resins, vinyl ester polymers such as polyvinyl acetate and polymers of vinyl dioxolanes, polymers containing ether groups, or carboxylic acid groups, ketone groups, hydroxyl groups, or amide groups described for example by Fang, U.S. Pat. No. 3,340,222, Koblitz et al. U.S. Pat. No. 3,324,069 and Humphrey Jr. et al., U.S. Pat. No. 5,922,493 all of which are incorporated herein by reference including the various United States patents cited in the foregoing references. Art known conductive polymers such as hydrolyzed acrylic resins also find use in these blends and can be used in lieu of electrolytes and/or ion transfer materials to enhance conductivity of the NCD copolymers. These polymer in the blend with the NCD copolymers of the present invention vary anywhere from about 1 to about 75 weight per cent, and especially from about 5 to about 60 weight percent and preferably from about 10 to about 25 weight percent based on the NCD copolymer in combination with the polymer employed in the blend.

Additionally, the NCD copolymers of the present invention may also contain pigments, dyes and fillers for that part of the RECLT device that does not require maximum optical clarity, such as for example, in displays or signs. Fillers or pigments include the various materials described by Fang (supra) and include in addition to silica, various organic dyes or inorganic pigments such as rutile titanium dioxide or antase titanium dioxide, iron oxides, lead compounds, magnesium, silicates, zinc oxides and the like in amounts from about 5 to about 40 percent and preferably about 15 to about 30 percent pigment volume concentration (volume of pigment based on the total volume of non-volatile components).

Selecting the NCD copolymer requires taking into account the percentage of comonomer such as hexofluoropropylene in the copolymer to provide absorption of the electrolyte salt-solvent combination sufficient to provide sufficient conductivity to enable the device to operate but not to high so as to cause the NCD copolymer to dissolve or lose structural integrity at operating temperatures of the device. Thus the selection turns on maintaining a balance between solvent absorption and the percentage of comonomer (e.g., hexofluoropropylene), conductivity and solvent/electrolyte salt absorption, and solubility of the NCD copolymer compared to comonomer (hexofluoropropylene) content of the NCD copolymer. In summary, optimizing the NCD copolymer focuses on obtaining high solvent/electrolyte salt absorption and high conductivity, but not so high as to compromise the structural integrity of the NCD copolymer when used in an RECLT device.

The present specification defines the invention as a composition, process or product made by the process of combining an NCD coplymer with an RECLT material, which means forming a solution of the NCD copolymer and mixing in the RECLT material or casting a film of the NCD copolymer, whether a nonporous or a porous film and impregnating it with an RECLT solution or dispersion. In some instances complexes of the RECLT material and the NCD copolymer form, and in other instances, a substantially simple mixture of an NCD copolymer with an RECLT material result. The combination of the NCD copolymer and RECLT material therefore by definition takes into account any product resulting from bringing the NCD copolymer into contact with the RECLT material.

The article of manufacture of the present invention comprises an NCD copolymer operatively associated with an RECLT material which includes an NCD copolymer combined with an RECLT material in the form of a film sandwiched between two substantially parallel electrodes.

The article of manufacture comprising the NCD copolymer operatively associated with the RECLT material also comprises an NCD copolymer film combined, e.g., mixed with an electrolyte or an ion transfer system such as a redox system discussed subsequently, and formed as a film. Sandwiching the film between two transparent electrodes, at least one of which has an RECLT coating material on it also comprises an article of manufacture based on an NCD copolymer operatively associated with an RECLT material. In this instance, the NCD copolymer with the conductive ionic compound or ion transfer system, is placed adjacent or next adjacent an RECLT material on at least one of the transparent electrodes.

Figure 1:
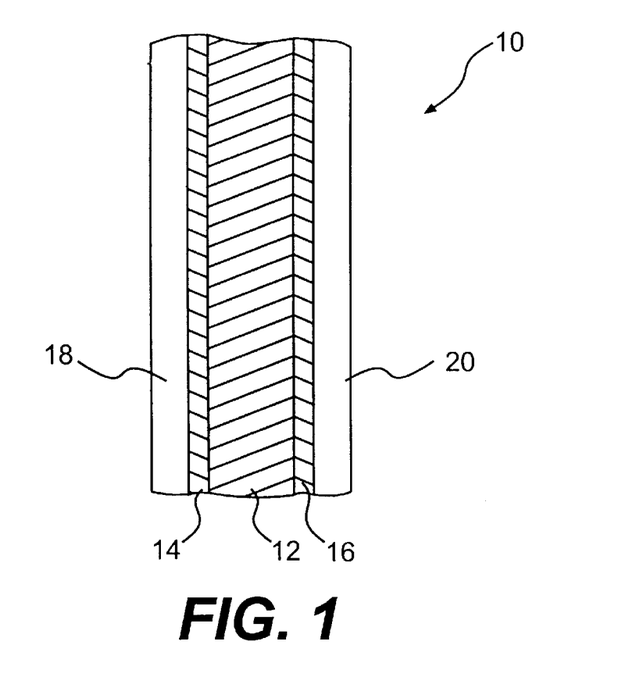
FIGS. 1 and 2 show cross-sections of RECLT devices in accord with the present invention.

In the drawings FIG. 1 illustrates an RECLT device 10 having an NCD film 12 comprising an NCD copolymer in combination with an electrochromic RECLT material such as ferrocene in combination with lithium perchlorate. Film 12 is sandwiched between, and adjacent to, two ITO electrodes 14 and 16 coated onto clear glass substrates 18 and 20. The RECLT material in film 12 may also comprise a reversible metal electrodeposition material, liquid crystal material or dispersed particle material as described herein. Application of an electrical current to electrodes 14 and 16 will change the opacity of film 12. Depending on the RECLT material in film 12, employing electrode 14 as a positive electrode and electrode 16 as a negative electrode will configure electrode 12 as a relatively clear or relatively opaque film and reversing the polarity of electrodes 14 and 16 will reverse this configuration of film 12.

Figure 2:
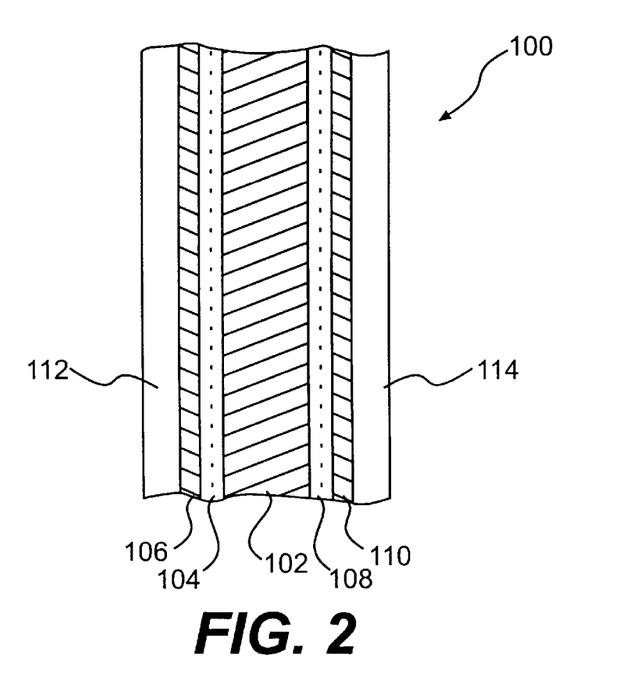

FIG. 2 illustrates an RECLT device 100 with an electrically conductive NCD film 102 which may contain an electrolyte or an ion transfer composition or compound in order to provide or enhance electrical conductivity of the NCD copolymer. An RECLT film 104 or 108 such as a tungsten trioxide film is positioned adjacent to film 102 in a manner known in the art, films 104 and 108 being coated on an electrically conductive film 106 and 110 respectively, such as an ITO film. These electrically conductive films 106 and 110 are coated on transparent substrates 112 and 114. In an alternative embodiment, film 104 may comprise a vanadium oxide coating and film 108 a tungsten trioxide coating to produce an electrochromic device.

In use, the application of a positive current to electrode 106 and a negative potential to electrode 110 will change the opacity of layers 104 and 108 and reversing them will reverse the change so that the device 100 can switch between an on and an off state, i.e., from a substantially clear to a substantially opaque state which, by reversing the charge through electrodes 106 and 110 will reverse the configuration of the device. Thus, in one embodiment, the device 100 comprises an electrochromic RECLT device; however, RECLT layers 104 and 108 may also comprise a reversible metal electrodeposition material, a liquid crystal material or a dispersed particle material.

In another embodiment, the film 12 of device 10 may comprise any mixture of electrochromic, reversible metal electrodeposition, liquid crystal and dispersed particle materials especially a two or three component mixture. Similarly, the RECLT device 100 may employ an electrochromic material as the RECLT layer 104 and a reversible metal electrodeposition material as the RECLT layer 108. Thus, the RECLT coatings 104 and 108 do not have to comprise the same RECLT materials and each can be any one of the electrochromic, reversible metal electrodeposition, liquid crystal or dispersed particle materials as described herein and as known in the art.

The specification subsequently describes ion transfer systems, e.g., a redox systems, such as a lithium perchlorate/ferrocene system or other organic electrochromic systems. These systems even though having electrochromic properties also find use as ion transfer systems, most of which comprise redox systems. In addition to the ion transfer systems, or other RECLT materials, the NCD copolymer includes an electrolyte or conductive ionic compound in the NCD copolymer when dissolved in a solvent (such as those subsequently described), and include $LiBF_4$, $LiBF_6$ $LiCLO4$ $LiPF_6$, $LICF_3SO_3$, $LiCF_3CO_2$, $LiAsF_6$, $LiSbF_6$, $LiB_{10}Cl_{10}$, lower aliphatic lithium carboxylates, $LiAlCl_4$, $LiCl$, $LiBr$, $LiI$, chloroboran lithium, and lithium tetraphenylborate. These lithium salts may be used either individually or in combinations of two or three or more. In particular, a solution of $LiCF_3SO_3$, $LiClO_4$ $LiBF_4$ or $LiBF_6$ and/or $LiPF_6$ in a mixed solvent of propylene carbonate or ethylene carbonate and 1,2-dimethoxyethane and/or diethyl carbonate comprises a preferred electrolytic solution.

The amount of the electrolytic solution to be used in the device is not particularly limited and can be selected according to the amounts of the positive and negative electrode active materials or the size of the device.

The concentration of the supporting electrolyte is preferably from 0.2 or 3 mols per liter of the electrolytic solution. In addition to electrolytic solutions, inorganic or organic solid electrolytes may also be employed. Examples of suitable inorganic solid electrolytes include a lithium nitride, a lithium halide, and a lithium oxyacid salt. The preferred solid electrolytes comprise $Li_3N$, $LiI$, $Li_5NI_2$, $Li_3N$—$LiI$—$LiOH$, $LiSiO_4$ $LiSiO4$-$LiI$—$LiOH$, $xLi_3PO_4$-$(1-x)Li_4SiO_4$, $Li_2SiS_3$, and phosphorous sulfide compounds.

The polyvinylidene fluoride film may also comprise a porous polyvinylidene fluoride copolymer manufactured according to the method of Humphrey, Jr. et al., (supra) or Benzinger et al., U.S. Pat. No. 4,383,047, both of which are incorporated herein by reference. The NCD copolymer also comprises either an alpha, gamma or beta polymer, or any mixtures thereof, as described by Humphrey Jr. et al., (supra).

The present invention relates to controlling light transmission. By definition, "light," as that term describes the invention, includes the visible spectrum, laser radiation, and also any invisible electromagnetic radiation, whether alpha ray, beta ray, gamma ray, or X-ray radiation, microwave radiation, maser radiation, A.M. radio wave radiation, F.M. radio wave radiation, the full I.R. spectrum and the full U.V. spectrum, and all wavelengths and frequencies extending between any pair of the foregoing. The terms "light" as used to describe "light transmission," and "electromagnetic radiation" as employed herein, in their broadest meanings, include electromagnetic radiation as defined in *Hackh's Chemical Dictionary*, Third Edition, p. 716, incorporated herein by reference, and especially electromagnetic radiation having a wavelength from about 0.01 Å to about 0.03 mm, i.e., from the shortest gamma ray wavelength to the longest infrared wavelength, and all wavelength values extending between any pair of these limits.

Electrochromism commonly refers to a reversible and visible change induced through the oxidation/reduction couple of an inorganic or organic species. A small electrical current at a DC potential of about 1V to about 2V induces this optical change, either cathodically or anodically.

Electrochromic devices generally comprise an electrochromic material operatively associated with a substantially transparent electrode and a counter electrode, one the cathode and the other, the anode. Conventionally, the electrochromic device comprises the electrochromic material sandwiched between the substantially transparent electrode and counter electrode. The most common electrochromic material employed comprises tungsten trioxide as the parent for the ion insertion/extraction group. Other inorganic as well as organic materials also function to produce an electrochromic effect. As noted before, no metal electrodeposition occurs in the electrochromic process based on metal type electrochromic materials.

The electrochromic material may comprise an organic or an inorganic compound well known in the art. Organic electrochromic materials may comprise, inter alia, ferrocene, a 4,4'-dipyridinium compound (i.e., a viologen), tetrathiafulvalene, arylpyrazoline, fluorene, benzoquinone, naphthoquinone, anthraquinone, pyrylium, pyridium, methylene blue, furil, ferroine, or complexes of diphthalocyanine and rare earth metals. Especially preferred rare earth metals comprise lutetium, ytterbium, gadolinium, neodymium, europium, lanthanum, cerium, erbidium and yttrium. Especially preferred organic electrochromic compounds comprise lutetium diphthalocyanine and heptylviologen.

The organic electrochromic compounds employed also require a second component to provide a redox system, also capable of functioning as an ion conductor in the polymer matrix. These compounds comprise alkali metal halides, alkaline earth metal halides, rare earth metal halides, halogenoalky ammonium, and their solid solutions, a complex of an alkali metal halide and crown ether, halogenopyridines such as iodo-1-n-butyl pyridinium and similar halogen ion conductive material, its hydrates and alkali ion conductive materials such as oxides of transition metals serving as alkali ion conductive materials, alkali metal perchlorates and especially lithium perchlorate, alkali metal tetrafluoroborates, alkali metal hexafluorophosphates, alkali metal nitrides, alkali metal aluminum tetrafluorides, alkali metal aluminum tetrachlorides, alkali metal thiocyanates, alkali metal trifluoroacetates, $M_{14}Zn$ ($GeO_4$), and M-beta-alumina where M represents an alkali metal, silver halides, copper halides and surfactants. Some preferred compounds include sodium sulfate, potassium chloride, lithium perchlorate, potassium perchlorate, sodium hexafluorophosphate, lithium and sodium methanetrifluorosulfonate. Any of these materials can be used in the electrolyte at concentrations of from about 0.0001M to about 3.0M, especially from about 0.0001 to about 1M.

Inorganic electrochromic materials may be employed as electrochromic materials, combined with the NCD copolymers, or as layers on an electrode of the RECLT article of manufacture and include transition metal compounds such as transition metal oxides that change from one valence state to another, e.g., transition metal compounds varying between a +2 and +3 valence state or transition metal compounds that vary between a +3 and +4 valence state. Tungsten oxide comprises a typical inorganic electrochromic material.

The electrochromic effect occurs in inorganic compounds by dual injection (cathodic) or ejection (anodic) of ions and electrons. A typical reaction for a cathodic coloring material comprises using colorless tungsten oxide and lithium as a coloration ion in a reversible system which upon the application of an EMF causes lithium ions to combine or intercalate with the colorless tungsten oxide to form a blue lithium-tungsten oxide material. A typical complimentary reversible anodic reaction comprises vanadium oxide combined with or intercalated with a lithium ion to form a compound having a light yellow color and withdrawing the lithium ion and electron to reversibly form vanadium oxide having a blue color. By employing both of these materials, one that colors on intercalation and one that colors on deintercalation, both sides of a device can color at the same time to produce greater optical density. Other electrochromic coloration ions include $H^+$, $Na^+$, and $Ag^+$. Other transition metal compounds especially suitable in addition to the tungsten oxide and vanadium oxide, comprise NiO, $MoO_3$, and $IrO_x$.

As noted, electrochromic devices based on these inorganic materials also require an ion-containing material or electrolyte in close proximity to the electrochromic layer as well as transparent layers for setting up the distributed electric field, and the present invention employs the NCD copolymer described herein with an ion containing material. These devices, similar to rocking chair batteries, as described by Humphrey, Jr. et al., (supra) transport ions back and forth into the electrochromic layer upon the application of an electric potential. Typical electrochromic windows comprise two transparent conductors, an electrolyte or ion conductor, a counter electrode and electrochromic layer. Certain crystalline forms of the transition metal materials may have substantial near-infrared modulations. For example, certain crystalline forms of tungsten oxide have the potential to control part of the infrared portion of solar energy whereas the more common amorphous form has only a slight effect. The invention includes all crystalline forms of these compounds.

One preferred ion containing material or electrolyte employed in the inorganic electrochromic materials generally comprises a lithium salt combined with the NCD copolymer or a lithium complex with the NCD copolymer. Examples of salts include not only lithium perchlorate but also $LiNbO_3$ and lithium complexed with various polymers or polyethylene oxide. These lithium salts are used with lithium systems such as $Li_xWo_3$. In addition, these systems also require an "ion storage" material such as Prussian blue, nickel oxides, cerium oxides, lithium vanadium oxides, nickel oxides, lithium cobalt oxides, and lithium nickel oxides. In proton systems such as $H_xWO_3$, the ion containing material can be tantalum oxide, or various polymeric materials known in the art. These inorganic proton systems also have an ion storage material such as nickel oxide, $Ir_xSn_yO_2{:}F$, tungsten oxide, a polyaniline compound, a copper grid, iridium oxide or a redox polymer. C. M. Lampert, Solar Energy Materials and Solar Cells, 52 (1998) 207–221 at p. 211, incorporated herein in its entirety, including pp. 207–221 and especially the authorities cited at pp. 220–21 describe these systems in detail. Other ion storage materials comprise ferrocene and other organic electrochromic materials noted herein and especially redox electrochromic materials.

Typically, the transparent electrodes comprise glass electrodes coated with ITO or $SnO_2{:}F$ known in the art. Additionally, polythylene terephthalate films find use as transparent electrodes.

Tests of symmetric electrochromic devices employing NCD polyvinylidene fluoride copolymer electrolytes, and constructed of near-equal tungsten oxide electrodes showed these devices switched reversibly.

In measuring the optical clarity of polyvinylidene fluoride homopolymers and copolymer films ranging, from zero percent hexafluoropropylene to 15 percent hexafluoropropylene, it became apparent that processing conditions including casting methods, solvent, substrate, drying conditions, and the like affected the clarity of the film.

The casting methods generally comprise knife coating or placing the solution on the substrate and spinning it to spread the solution of copolymer in solvent evenly over the surface of the substrate. The selection of solvents is important to control the clarity of the film in that solvents that dry too rapidly tend to leave a haze in the film. Placing a ventilated cover over the cast film can control the evaporation of these types of solvents. Highly polished substrates tend to produce films with greater clarity, e.g., glass substrates as opposed to metal substrates having burnished or matte finish.

Solvents suitable for producing the film comprise organic solvents such as aprotic solvents, including propylene carbonate, ethylene carbonate, butylene carbonate, dimethyl carbonate, diethyl carbonate, gamma-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, methyl propionate, ethyl propionate, phosphoric triesters, trimethoxymethane, dioxolane derivatives, sulfolane, 3-methyl-2-oxazolidinone, propylene carbonate derivatives, tetrahydrofuran derivatives (as described in JP-A-63-32872), ethyl ether, and 1,2 propanesulfone. Solvents described by Koblitz et al. (supra) also find use in the invention. These solvents may be used either individually or in combinations of two or three or more thereof.

In evaluating the films produced following the foregoing processing conditions, optical clarifies ranged, depending upon the processing conditions, from 12 to 99 percent using BYK haze-gard plus instrument. The optical clarity of copolymer films swollen in an electrolyte also ranged from 97 to 99 percent.

The following examples illustrate the invention.

EXAMPLES ON THE PREPARATION OF CLAR FILMS, SWELLING OF FILM WITH ELECTROLYTE AND CONDUCTIVITY MEASUREMENTS

Example 1

A 10 wt % solution of KYNAR FLEX 2801, a broad distribution $VF_2$-HFP (vinylidene fluoride-hexafluoropropylene) copolymer with an average of about 10 wt % HFP was dissolved in N-methyl pyrrolidinone at 60° C. for 1 hour. The solution was then cast on glass and dried in a convection oven at 165° C. for 30 minutes. The resulting dry film was about 15 μm thick. It was peeled from the substrate and its optical clarity measured using a BYK-Gardner haze-gard plus instrument. It was found to have a clarity of 94.9%.

Example 2

A 10 wt % solution of a narrow distribution composition $VF_2$-HFP copolymer (copolymer 1) with an average of about 7 wt % HFP was dissolved in N-methyl pyrrolidinone at 60° C. for 1 hour. The solution was then cast on glass and dried in a convection oven at 165° for 30 minutes. The resulting dry film was about 15 μm thick. It was peeled from the substrate and its optical clarity was measured using a BYK-Gardner haze-gard plus instrument. It was found to have a clairty of about 97.8%.

Example 3

A 10 wt % solution of a narrow distribution composition $VF_2$-HFP copolymer (copolymer 2) with an average of about 15 wt % HFP was dissolved in N-methyl pyrroilidinone at 60° C. for 1 hour. The solution was then cast on glass and dried in a convection oven at 165° C. for 30 minutes. The resulting dry film was about 15 μm thick. It was peeled from the substrate and its optical clarity was measured using a BYK-Gardner haze-gard plus instrument. It was found to have a clarity of 98.8%.

Example 4

A 10 wt % solution of a narrow distribution composition $VF_2$-HFP copolymer (copolymer 2) with an average of about 15 wt % HFP was dissolved in a 50/50 acetone/ethyl acetate mixture at room temperature for 1 hour. The solution was then cast on glass and dried in a convection oven at 30° for 30 minutes. The resulting dry film was about 15 μm thick. It was peeled from the substrate and its optical clarity was measured using a BYK-Gardner haze-gard plus instrument. It was found to have a clarity of 99.8%.

Example 5

A 15 μm film made from copolymer 1 was dipped in a 1M $LiClO_4$ in propylene carbonate solution. The film absorbed the solution and its weight increased 81% at equilibrium.

Example 6

A porous KYNAR FLEX 2801/silica film was prepared with a thickness of about 100 μm. It was dipped in a 1M$LiPF_6$ solution in a dry box atmosphere and its weight increased 130% at equilibrium. The ionic conductivity of the impregnated film was measured using impedance spectroscopy and was found to be about 1 mS/cm at room temperature.

Examples 1 and 2 show the optical clarity obtained for a BCD vs NCD material processes under the same conditions. Although the average HFP % is not the same, the NCD material has better clarity despite its lower HFP amount. Ordinarily, a lower HFP content in BCD copolymers result in lower clarity. Examples 2 and 3 both refer to NCD materials. They show that the higher the HFP % the better the optical clarity of the material. Examples 3 and 4 show that the conditions of film casting (in this case solvent and drying temperature) affect the optical clarity for the same copolymer. Example 5 shows an example of absorption of electrolyte by the film. Example 6 shows an example of the ionic conductivity that can be obtained by a gel electrolyte (membrane plus Li ion solution).

Examples 7–11

Casting a 10% solution of polyvinylidene fluoride polymer in acetone into a petri dish and allowing it to dry at room temperature to form a 75 micron film, followed by impregnating it with a dimethyl carbonate solution of 0.5 M ferrocene and 0.5 M $LiClO_4$ produced an electrolyte film. Sandwiching the film between two pieces of electrochromic glass comprising a glass substrate having an indium oxide, tin oxide conductive coating on it and a tungsten trioxide coating on top of the conductive coating produced an electrochromic device. Using electrodes attached to the glass, and applying a DC power source switched the device "on" with a low voltage current. Time to coloration (blue-clear-blue) was measured as well as voltage necessary to achieve coloration. Table 1 summarizes the results.

provide conductivity to the electrolyte. Other electrolyte salts find use in the composition such as alkaline earth metal ions or tetra-alkylammonium ions.

In addition, the electrolyte includes an active metal salt such as a salt based on silver (I), copper (II), bismuth (III), or other metal systems such as, for example, silver perchlorate and trifluoromethane sulfonate. Sometimes the electrolyte will require an additive to complex metal ions in order to stabilize them against thermal or photolytic decomposition to elemental metals and increase the voltage required for electrodeposition thereby improving plating quality. Nitriles, amines, phosphines, sulfur donors such as, for example, $[Cu(nitrile)_4]CF_3SO_3$, function effectively to stabilize Ag (I) and Cu (I). Some additives prevent dendrite growth which can lead to electrical short circuiting. The reversible metal electrodeposition article of manufacture, film, and composition of the present invention employs as the polymer matrix in the clear gel electrolyte, NCD polyvinylidene fluoride polymers described herein. Tench et al., U.S. Pat. No. 5,903,382 describes reversible metal electrodeposition compositions and devices for light modulation in further detail, and is incorporated herein by reference.

TABLE 1

| Example | HFP (wt %) | ΔH J/g | MW | color (swollen membrane) | switching voltage (V) | speed of switching |
|---|---|---|---|---|---|---|
| 7 BCD | 9 | 35 | 450 K | porous membrane | white | 0.73 | fast |
| 8 NCD | 6.9 | 34 | 433 K | film | clear | 2.0 | slow |
| 9 NCD | 8.9 | 33.5 | 375 k | film | clear | 2.0 | slow |
| 10 NCD | 18 | | | film | clear | 2.0 | |
| 11 NCD | 5.6 | 38 | 675 K | film | clear | 1.9 | fast |

In its broadest aspect, however, the present invention relates not only to electrochromic materials, but also reversible metal electrodeposition systems for light modulation, liquid crystal-based window systems that switch between transmissive and opaque/scattering states by the application of a DC voltage, and dispersed particle systems. All four fall within the category of RECLT phenomenon.

Reversible metal electrodeposition systems for light modulation, known in the art, comprise applying a negative electrical potential to a first electrode relative to a second electrode where the applied potential tends to cause deposited metal to be dissolved from the second electrode into an electrolytic solution placed between the electrodes and to electrodeposit the metal from the solution onto the first electrode impeding the propagation of electromagnetic radiation through the device. Conversely, by reversing the polarity and applying a positive electrical potential to the first electrode relative to the second electrode, the applied potential tends to cause deposited metal to dissolve from the first electrode and electrodeposit it into the electrolytic solution and then the second electrode, thereby increasing the transmissivity of the device. An electrolyte suitable in this application comprises an optically clear gel electrolyte based on an electrochemically inert polymer.

The electrolyte includes a solvent with a low freezing point, high boiling point and high dielectric constant such as propylene carbonate or in combination with an electrolytic salt such as a lithium salt with a strong acidic anion such as, for example, a perchlorate, hexafluorophosphate, trifluoromethane sulfonate or bis-trifluoromethane sulfonamide to Other materials suitable in the reversible metal electrodeposition films, articles of manufacture and compositions of the present invention comprise compounds of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

The invention also comprises employing the NCD polymers as described herein as part of a liquid crystal based RECLT system. The two classes of liquid crystal systems comprise twisted nematic, guest-host, surface stabilized ferroelectric systems and dispersed liquid crystal systems. Applying an electric field to the system changes the orientation of liquid crystal molecules interspersed between two conductive electrodes to obtain optical switching. The field strength changes the orientation of the liquid crystals thereby altering the optical properties of the system. Commercial glazing only employs dispersed liquid crystal systems, which fall into two types, the polymer dispersed liquid crystal (PDCL) and encapsulated liquid crystal (NCAP-nematic curvlinear aligned phase) which consist of nematic liquid crystals distributed in micro cavities. These systems are described by Drzaic, *Appl. Phys.*, 60 (1986) 2142 and Fergason, *SID Digest*, 85 (1985) 68, incorporated herein by reference. NCAP films are formed from a emulsion whereas PDCL films are form from an isotropic solution. Lampert, supra, illustrates the construction of these dispersed liquid devices which generally comprise a glass electrode dielectric material the polymer dispersed liquid crystal (PDCL) dielectric layer and a conductive glass layer.

Lampert notes in this regard that these devices suffer the drawbacks of a poor diffuse unpowered state, haze remains in the activated (transparent) state, and poor U.V. stability. Employing the NCD copolymers of the present invention with improved clarity and exceptional U.V. resistance as the polymer for these liquid crystal systems can substantially minimize some of these drawbacks.

The dispersed particle RECLT systems of the present invention comprises an active layer having needle shaped particles of dihydrocinchonidine bisulfite polyiodide or heraphathite about one micron long suspended or encapsulated in the NCD copolymers as described herein. The dispersed particle RECLT device of the present invention comprises the NCD polymers having the dispersed particles therein formed into a layer placed between two electrical conductors. Upon the application of an electrical field, the particles align with the field causing transmission through the device to increase. By switching the electric field off, the particles assume a random condition and become light absorbing. A typical device has the same structure as the liquid crystal device, however, the active material comprises a film of the dispersed particles in the NCD copolymer of the present invention in lieu of the polymer dispersed liquid crystal (PDCL) dispersed liquid crystal device previously described.

The RECLT films and articles of manufacture of the invention find use in window glass to adjust light transmission and can control heat loss, or find use in automobile sun roofs, mirrors, display devices such as calculator screens, clocks, or as shutters for cameras and in switching devices to modify the transmission of electromagnetic energy from a source to a sensor. Additionally, the RECLT articles of manufacture can be used to convert electromagnetic energy, such as light from a steady output to a pulsed output to transmit information or generate an electromagnetic signal such as a light signal at variable or steady state frequencies. In modulating the transmission of electromagnetic energy such as light waves, the articles of manufacture of the present invention can be employed to generate information for the operation of computers by modulating electromagnetic energy between a source and a sensor from an off (0) stage to an on (1) stage.

The various numerical ranges describing the invention as set forth throughout the specification also include any combination of the lower ends of the ranges with the higher ends of the ranges set forth herein including, Inter alia, ranges of concentrations of compounds, ratios of these compounds to one another, light wave frequencies, molecular weights, ratios of comonomers to one another, and the like, as well as all whole number and/or fractional number values and ranges encompassed within these ranges.

Various combinations of components employed according to the foregoing description include especially the two component, three component or four component combinations, where the system contains three or four or more components such as, for example, the combinations of comonomers employed in the copolymer of the present invention.

It will be apparent to those skilled in the art that they can modify and make variations to the RECLT film, process of manufacturing the film, article of manufacture and composition of matter of the present invention without departing from the spirit or scope of the invention. The invention, however, includes these modifications and variations and their equivalents provided they come within the scope of the appended claims.

What we claim is:

1. An RECLT film comprising a conductive narrow composition distribution polyvinylidene fluoride copolymer film combined with an electrolyte and operatively associated with an RECLT material, wherein said narrow composition distribution polyvinylidene fluoride copolymer film has the characteristics of a polyvinylidene fluoride copolymer having up to 8 weight percent nominal hexafluoropropylene content having weight percent extractables within plus or minus 1.5% of the percent by weight extractables calculated by an equation selected from the group consisting of:

a)

$$\text{Wt. \% Extractables} = 1.7 \text{ (HFP mole \%)} \ 3.2,$$

and b)

$$\text{Wt. \% Extractables} = -1.2 + 1.5 \text{ (HFP mole \%)} - 8 \times 10^{-6} \text{ (Mn)}$$

when the HFP content is determined by Method A; or a copolymer of vinylidene fluoride and hexafluoropropylene, having 8 weight percent or greater nominal hexafluoropropylene content, having a DSC melting point equal to or less than that defined by the equation:

$$\text{DSC melt point } °C. = 166.7 - 2.9 \text{ (HFP wt \%)},$$

when the HFP content is determined by Method B; and wherein said RECLT material is selected from
an electrochromic material,
a reversible metal electrodeposition material,
a liquid crystal material, and
a dispersed particle material.

2. The RECLT film of claim 1 wherein said polyvinylidene fluoride copolymer film is porous or non-porous.

3. The RECLT film of claim 1 wherein said polyvinylidene fluoride copolymer film is a copolymer of vinylidene fluoride with hexafluoropropylene, or tetrafluoroethylene, or chlorotrifluoroethylene, or vinyl acetate, or combinations thereof.

4. The RECLT film of claim 1 wherein said RECLT material is an organic compound.

5. The RECLT film of claim 1 wherein said RECLT material is an organic electrochromic material.

6. The RECLT film of claim 5 wherein said organic electrochromic material is ferrocene, a 4,4'-dipyridinium compound, tetrathiafulvalene, arylpyrazoline, fluorene, benzoquinone, naphthoquinone, anthraquinone, pyrylium, a pyridium, methylene blue, furil, ferroine, and complexes of diphthalocyanine and rare earth metals.

7. The RECLT film of claim 1 wherein said RECLT material is an inorganic compound.

8. The RECLT film of claim 1 wherein said RECLT material is an inorganic electrochromic material.

9. The RECLT film of claim 8 wherein said electrochromic material is an inorganic material based on transition metal compounds that vary between a +2 and +3 valence state or transition metal compounds that vary between a +3 and +4 valence state.

10. The RECLT film of claim 1 wherein said RECLT material is a compound of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

11. The RECLT film of claim 1 wherein said RECLT material is an electrochromic material and comprises tungsten oxide.

12. The RECLT film of claim 1 where in said RECLT material is a reversible metal electrodeposition material.

13. The RECLT film of claim 1 wherein said RECLT material is a liquid crystal material.

14. The RECLT film of claim 1 wherein said RECLT material is a dispersed particle material.

15. The RECLT film of claim 1 wherein said copolymer is an alpha, gamma, or beta polyvinylidene fluoride copolymer or mixtures thereof.

16. The RECLT film of claim 1 wherein said copolymer is a copolymer of vinylidene fluoride and hexafluoropropylene containing a maximum of about 24 weight percent hexafluoropropylene, having a uniform distribution of hexafluoropropylene residue between chains.

17. The RECLT film of claim 16 wherein said copolymer is a copolymer of vinylidene fluoride and hexafluoropropylene, having solutions of improved clarity and fluidity.

18. An RECLT article of manufacture comprising a conductive narrow composition distribution polyvinylidene fluoride copolymer film combined with an electrolyte and operatively associated with an RECLT material, a substantially transparent electrode, and a counter electrode wherein said narrow composition distribution polyvinylidene fluoride copolymer film has the characteristics of a polyvinylidene fluoride copolymer having up to 8 weight percent nominal hexafluoropropylene content having weight percent extractables within plus or minus 1.5% of the percent by weight extractables calculated by an equation selected from the group consisting of:

a)

$$\text{Wt. \% Extractables} = 1.7 \, (\text{HFP mole \%}) \, 3.2,$$

and b)

$$\text{Wt. \% Extractables} = -1.2 + 1.5 \, (\text{HFP mole \%}) - 8 \times 10^{-6} \, (\text{Mn})$$

when the HFP content is determined by Method A; or a copolymer of vinylidene fluoride and hexafluoropropylene, having 8 weight percent or greater nominal hexafluoropropylene content, having a DSC melting point equal to or less than that defined by the equation:

$$\text{DSC melt point } ^\circ C. = 166.7 - 2.9 \, (\text{HFP wt \%}),$$

when the HFP content is determined by Method B; and wherein said RECLT material is selected from
an electrochromic material,
a reversible metal electrodeposition material,
a liquid crystal material, and
a dispersed particle material.

19. The RECLT article of manufacture of claim 18 wherein said film is porous or non-porous.

20. The RECLT article of manufacture of claim 18 wherein said polyvinylidene fluoride copolymer film is a vinylidene fluoride copolymer with hexafluoropropylene, or tetrafluoroethylene, or chlorotrifluoroethylene, or vinyl acetate, or combinations thereof.

21. The RECLT article of manufacture of claim 18 wherein said RECLT material is an organic compound.

22. The RECLT article of manufacture of claim 18 wherein said RECLT material is an organic electrochromic material.

23. The RECLT article of manufacture film of claim 22 wherein said organic electrochromic material is ferrocene, a 4,4'-dipyridinium compound, tetrathiafulvalene, arylpyrazoline, fluorene, benzoquinone, naphthoquinone, anthraquinone, pyrylium, pyridium, methylene blue, furil, ferroine, and complexes of diphthalocyanine and rare earth metals.

24. The RECLT article of manufacture of claim 18 wherein said RECLT material is an inorganic compound.

25. The RECLT article of manufacture of claim 18 wherein said RECLT material is an inorganic electrochromic material.

26. The RECLT article of manufacture of claim 25 wherein said electrochromic material is an inorganic material based on transition metal compounds that vary between a +2 and +3 valance state or transition metal compounds that vary between a +3 and +4 valance state.

27. The RECLT article of manufacture of claim 18 wherein said RECLT material is a compound of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

28. The RECLT article of manufacture of claim 18 wherein said RECLT material is an electrochromic material and comprises tungsten oxide.

29. The RECLT article of manufacture of claim 18 wherein said RECLT material is a reversible metal electrodeposition material.

30. The RECLT article of manufacture of claim 18 therein said RECLT material is a liquid crystal material.

31. The RECLT article of manufacture of claim 18 wherein said RECLT material is a dispersed particle material.

32. The RECLT article of manufacture of claim 18 wherein said copolymer is an alpha, gamma, or beta polyvinylidene fluoride copolymer or mixtures thereof.

33. The RECLT article of manufacture of claim 18 wherein said copolymer is a copolymer of vinylidene fluoride and hexafluoropropylene containing a maximum of about 24 weight percent hexafluoropropylene, having a uniform distribution of hexafluoropropylene residue between chains.

34. The RECLT article of manufacture of claim 33 wherein said copolymer is a copolymer of vinylidene fluoride and hexafluoropropylene, having solutions of improved clarity and fluidity.

35. An RECLT composition of matter comprising a conductive narrow composition distribution polyvinylidene fluoride copolymer combined with an RECLT material and an electrolyte wherein said narrow composition distribution polyvinylidene fluoride copolymer film has the characteristics of a polyvinylidene fluoride copolymer having up to 8 weight percent nominal hexafluoropropylene content having weight percent extractables within plus or minus 1.5% of the percent by weight extractables calculated by an equation selected from the group consisting of:

a)

Wt. % Extractables=1.7 (HFP mole %) 3.2, and b)

Wt. % Extractables=−1.2+1.5 (HFP mole %)−8×10$^{-6}$ (Mn)

when the HFP content is determined by Method A; or a copolymer of vinylidene fluoride and hexafluoropropylene, having 8 weight percent or greater nominal hexafluoropropylene content, having a DSC melting point equal to or less than that defined by the equation:

DSC melt point ° C.=166.7−2.9 (HFP wt %), when the HFP content is determined by Method B;
wherein said RECLT material is selected from
   an electrochromic material,
   a reversible metal electrodeposition material,
   a liquid crystal material, and
   a dispersed particle material.

36. The composition of claim 35 wherein said polyvinylidene fluoride copolymer is porous or non-porous.

37. The composition of claim 35 wherein said polyvinylidene fluoride copolymer is a vinylidene fluoride copolymer with hexafluoropropylene, or tetrafluoroethylene, or chlorotrifluoroethylene, or vinyl acetate, or combinations thereof.

38. The composition of claim 35 wherein said RECLT material is an organic compound.

39. The composition of claim 35 wherein said RECLT material is an organic electrochromic material.

40. The composition of claim 39 wherein said organic electrochromic material is ferrocene, a 4,4'-dipyridinium compound, tetrathiafulvalene, arylpyrazoline, fluorene, benzoquinone, naphthoquinone, anthraquinone, pyrylium, pyridium, methylene blue, furil, ferroine, and complexes of diphthalocyanine and rare earth metals.

41. The composition of claim 35 wherein said RECLT material is an inorganic compound.

42. The composition of claim 35 wherein said RECLT material is an inorganic electrochromic material.

43. The composition of claim 42 wherein said electrochromic material is an inorganic material based on transition metal compounds that vary between a +2 and +3 valence state or transition metal compounds that vary between a +3 and +4 valence state.

44. The composition of claim 35 wherein said RECLT material is a compound of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

45. The composition of claim 35 wherein said RECLT material is an electrochromic material and comprises tungsten oxide.

46. The composition of claim 35 wherein said RECLT material is a reversible metal electrodeposition material.

47. The composition of claim 35 wherein said RECLT material is a liquid crystal material.

48. The composition of claim 35 wherein said RECLT material is a dispersed particle material.

49. The RECLT film of claim 35 wherein said copolymer is an alpha, gamma, or beta polyvinylidene fluoride copolymer or mixtures thereof.

50. The RECLT composition of claim 35 wherein said copolymer is a copolymer of vinylidene fluoride and hexafluoropropylene containing a maximum of about 24 weight percent hexafluoropropylene, having a uniform distribution of hexafluoropropylene residue between chains.

51. The RECLT composition of claim 50 wherein said copolymer is a copolymer of vinylidene fluoride and hexafluoropropylene, having solutions of improved clarity and fluidity.

52. A process of manufacturing an RECLT composition of matter comprising combining a conductive narrow composition distribution polyvinylidene fluoride copolymer with an electrolyte and an RECLT material wherein said narrow composition distribution polyvinylidene fluoride copolymer film has the characteristics of a polyvinylidene fluoride copolymer having up to 8 weight percent nominal hexafluoropropylene content having weight percent extractables within plus or minus 1.5% of the percent by weight extractables calculated by an equation selected from the group consisting of:

a)

Wt. % Extractables=1.7 (HFP mole %) 3.2, and b)

Wt. % Extractables=−1.2+1.5 (HFP mole %)−8×10$^{-6}$ (Mn)

when the HFP content is determined by Method A; or a copolymer of vinylidene fluoride and hexafluoropropylene, having 8 weight percent or greater nominal hexafluoropropylene content, having a DSC melting point equal to or less than that defined by the equation:

DSC melt point ° C.=166.7−2.9 (HFP wt %), when the HFP content is determined by Method B;
wherein said RECLT material is selected from
   an electrochromic material,
   a reversible metal electrodeposition material,
   a liquid crystal material, and
   a dispersed particle material.

53. The process of claim 52 wherein said polyvinylidene fluoride copolymer is porous or non-porous.

54. The process of claim 52 wherein said polyvinylidene fluoride copolymer is a copolymer of vinylidene fluoride with hexafluoropropylene, or tetrafluoroethylene, or chlorotrifluoroethylene, or vinyl acetate, or combinations thereof.

55. The process of claim 53 wherein said RECLT material is an organic compound.

56. The process of claim 53 wherein said RECLT material is an organic electrochromic material.

57. The process of claim 52 wherein said organic electrochromic material is ferrocene, a 4,4'-dipyridinium compound, tetrathiafulvalene, arylpyrazoline, fluorene, benzoquinone, naphthoquinone, anthraquinone, pyrylium, pyridium, methylene blue, furil, ferroine, and complexes of diphthalocyanine and rare earth metals.

58. The process of claim 52 wherein said RECLT material is an inorganic compound.

59. The process of claim 52 wherein said RECLT material is an inorganic electrochromic material.

60. The process of claim 59 wherein said electrochromic material is an inorganic material based on transition metal compounds that vary between a +2 and +3 valence state or transition metal compounds that vary between a +3 and +4 valence state.

61. The process of claim 52 wherein said RECLT material is a compound of zinc, cadmium, lead, silver, copper, iron, nickel, tin, indium, platinum, palladium, gold, bismuth, antimony, tellurium, manganese, thallium, selenium, gallium, arsenic, mercury, chromium, tungsten, and molybdenum.

62. The process of claim 52 wherein said RECLT material is an electrochromic material and comprises tungsten oxide.

63. The process of claim 52 wherein said RECLT material is a reversible metal electrodeposition material.

64. The process of claim 52 wherein said RECLT material is a liquid crystal material.

65. The process of claim 52 wherein said RECLT material is a dispersed particle material.

66. The RECLT film of claim 52 wherein said copolymer is an alpha, gamma, or beta polyvinylidene fluoride copolymer or mixtures thereof.

67. The process of claim 53 wherein said copolymer is a copolymer of vinylidene fluoride and hexafluoropropylene containing a maximum of about 24 weight percent hexafluoropropylene, having a uniform distribution of hexafluoropropylene residue between chains.

68. The process of claim 67 wherein said copolymer is a copolymer of vinylidene fluoride and hexafluoropropylene, having solutions of improved clarity and fluidity.

69. A product produced by the process of claim 52.
70. A product produced by the process of claim 53.
71. A product produced by the process of claim 55.
72. A product produced by the process of claim 58.
73. A product produced by the process of claim 67.

* * * * *